Patented Aug. 10, 1943

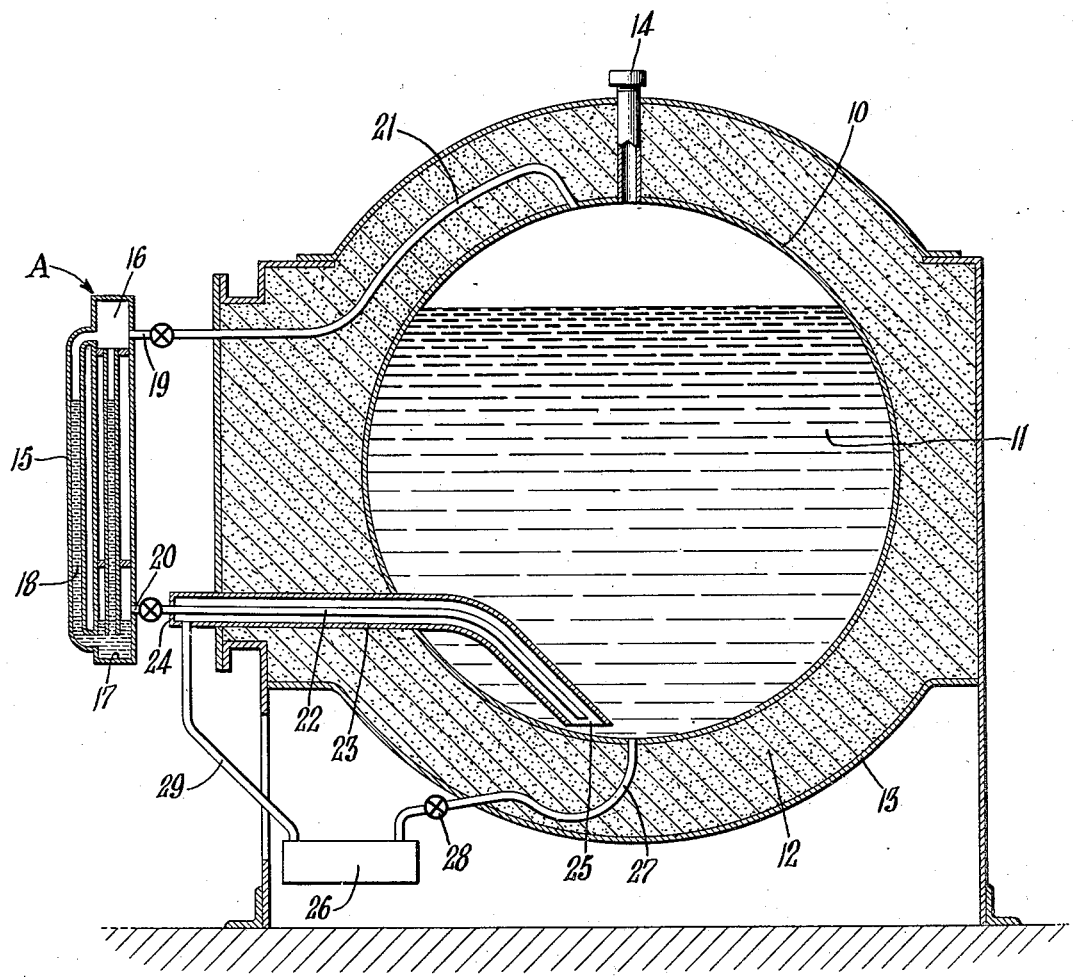

2,326,511

UNITED STATES PATENT OFFICE 2,326,511

LIQUID LEVEL GAUGE

George H. Zenner, Kenmore, N. Y., assignor to The Linde Air Products Company, a corporation of Ohio Application January 31, 1941, Serial No. 376,768

4 Claims. (Cl. 73—302)

This invention relates to an improvement in liquid level gauges and more particularly to devices for indicating the level of a volatile liquid such as a liquefied gas or mixture of gases that has a boiling point below atmospheric temperatures at the existing pressure, as for example, liquid oxygen.

It is customary to measure the depth of a liquid in a container by balancing a column of liquid in a liquid level gauge against the differences of pressure between points above and below the surface of the liquid in the container. When the liquid in the gauge is of greater density than the liquid in the container, the gauge may be shorter than the maximum height of the liquid to be measured. If a different liquid is used in the gauge than that being measured, and particularly if the liquid, the level of which is to be measured, is a volatile liquid such as liquid oxygen, it is necessary that the higher pressure at the measuring point below the surface of the liquid in the container should be transmitted to the gauge liquid solely by gaseous pressure. A suitable arrangement of liquid level gauge of the latter variety is shown and described in my earlier United States Patent 2,032,681 issued March 3, 1936. It will be observed that the higher-pressure side of the gauge shown in this patent is connected to the lower portion of the liquid oxygen container by a measuring tube which is intended to be maintained full of gas. It has been found, however, that a certain inaccuracy of indication sometimes occurs which is at least in part caused by an uncertainty in the exact level of the liquid oxygen at the measuring end of the measuring tube in the lower portion of the oxygen container. Further inaccuracies can also be caused by the presence of any unevaporated liquid that may have been forced into the measuring tube by pressure surges occurring in the liquid container, by condensation of gas in the tube, or by slight leaks at the tube connections.

It is a principal object of the present invention to provide means for overcoming the aforementioned difficulties. Another object of the invention is to provide an improved liquid gauge arrangement in which the measuring tube leading to the lower portion of the container is maintained free of liquid and which makes it possible for an operator to be assured that the liquid level indicated by the gauge is a true indication of the liquid level in the container.

These and other objects and novel features of the invention will become apparent from the following description taken in connection with the accompanying drawing which shows a sectional view of an exemplary liquid level gauge and liquid holding container having improved lower and higher-pressure connections according to the invention.

According to the present invention, the liquid phase connection or measuring tube is surrounded by a jacket tube into which a relatively slow flow of gas of the same composition as the liquefied gas in the container is introduced so as to flow through the jacket tube and past the end of the measuring tube. Such flow of gas insures the maintenance of a liquid level accurately at the measuring end of the jacket tube, and consequently the pressure in the measuring tube becomes an accurate measure of the liquid level. The measuring tube and jacket tube are both pitched to drain toward the measuring end, and any liquid in the tubes will be drained out and replaced by gas. The jacket tube furthermore serves to insulate the measuring tube from direct heat exchange with the volatile liquid in the container and thereby condensation of gas in the measuring tube is prevented.

Referring now to the drawing, the liquid container illustrated is one which is adapted to hold liquid oxygen and comprises an inner container or vessel 10 for holding a body of liquid oxygen 11. The vessel 10 is protected from the heat of the atmosphere by a relatively thick layer of insulation 12 supported within an outer casing 13. A connection for introducing the liquid oxygen is indicated at 14. The liquid container may be provided with various other auxiliary devces such as pressure relief valves, liquid and gas withdrawal connections, etc., which form no part of the present invention and are therefore not illustrated.

The liquid level indicator may be any suitable device capable of indicating a difference of pressure. The indicator herein shown is similar to that shown and described in the aforementioned Patent 2,032,681. Such indicator shown generally at A, comprises a gauge glass 15 connected between an upper low-pressure chamber 16 and a lower high-pressure chamber 17. The high-pressure chamber 17 and the gauge glass contain a relatively heavy indicating liquid 18 as described in the aforesaid patent. The low-pressure chamber 16 has a low-pressure connection 19 and the higher-pressure chamber 17 has a high-pressure connection 20 at a point above the level of the liquid 18. Such connections may be provided with valves which may be closed if it is desired to adjust or remove the indicator A for any purpose. The low-pressure connection 19 is connected in gaseous communication with the upper portion of the vessel 10 by a tube 21. The high-pressure connection 20 is placed in gaseous communication with a point in the liquid 11 below the normal liquid level or at the lowest level to be measured by a measuring tube 22. The measuring tube is surrounded by a jacket tube 23 of larger diameter which has an end 24 outside of the vessel 10 that is sealed to the atmosphere and through which the tube 22 passes, and an inner end 25 which extends slightly beyond the end of the measuring tube 22. At least the inner portions of the measuring tube 22 and the jacket tube 23 are pitched toward the measuring end 25. While the measuring tube 22 preferably extends through almost the full length of the jacket tube 23, it is also contemplated that the measuring tube 22 may be shorter or substantially eliminated.

To insure the maintenance of the liquid level at the measuring end 25 of the jacket tube 23, means is provided to pass gas at a relatively slow rate into the jacket tube 23 so that the gas will flow therethrough toward the measuring point 25. Such gas will escape from the end 25 and be either condensed by heat exchange with the volatile liquid 11 or bubble upwardly therethrough to the gas space above the liquid. According to the invention, the desired supply of such gas is provided by a vaporizer 26 located outside of the casing 13 so that it will be heated by the atmosphere. Other means for heating the vaporizer 26 could, of course, be provided. A connection 27 leading from the vessel 10 at a point below the measuring point 25 conducts portions of liquid to the vaporizer 26 and has a valve 28 interposed therein to regulate the flow. The vapors produced in the vaporizer 26 are conducted to the jacket tube 23 by a conduit 29.

When the operator desires to be assured that the liquid level reading shown by the gauge A is accurate, the valve 28 is opened sufficiently to allow a small quantity of the liquid to flow from the vessel 10 into the vaporizer 26 and become vaporized therein. From the vaporizer 26 the vapors flow through the conduit 29 and along the jacket tube 23 to the measuring point 25 and any liquid that may have risen in the jacket tube 23 due to condensation of gas by heat exchange with the surrounding liquid 11, or for any other reason, will be forced out and a steady liquid level will be maintained at the measuring point 25. Since the tube 22 is pitched toward the point 25, any liquid therein will flow out toward the main body of liquid 11 as soon as the liquid level in the jacket tube 23 is forced below the end of the tube 22. During the time that no observations of the liquid level are to be made, the valve 28 is preferably kept closed so that there is no excessive development of pressure in the container 10.

Although a preferred embodiment of this invention has been described and illustrated, it will be understood that changes may be made in the details thereof without departing from the spirit and scope of the invention.

I claim:

1. A liquid level indicating device for a container holding a volatile liquid having a normal boiling point substantially below atmospheric temperatures comprising means for indicating a pressure difference, said indicating means having lower- and higher-pressure connections; means connecting said lower-pressure connection in gaseous pressure communication with the gas space above the liquid in said container; a measuring tube connecting the higher-pressure connection of said indicating means with a point in said container below the level of the liquid therein; means for passing vapors of said stored liquid to the end of said tube in said container to maintain said tube free from liquid; and a vaporizing device constructed and arranged for controllably vaporizing portions of said stored liquid by atmospheric heat to provide said vapors.

2. A liquid level indicating device for a container holding a volatile liquid comprising means for indicating a pressure difference, said indicating means having lower- and higher-pressure connections; means connecting said lower-pressure connection in gaseous pressure communication with the gas space above the liquid in said container; a jacket tube passing through the wall of said container to a point in the volatile liquid below the normal liquid level, at least the inner end of said jacket tube being downwardly pitched; a measuring tube connecting a point within said jacket tube in gaseous communication with the higher-pressure connection of said indicating means; a vaporizing device; means for controllably passing relatively small portions of said volatile liquid into said vaporizing device; and means for passing vapors produced in said vaporizing device into said jacket tube for maintaining a liquid level accurately at the end of said jacket tube.

3. A liquid level indicating device for a container holding a volatile liquid having a normal boiling point below atmospheric temperatures comprising means for indicating a pressure difference, said indicating means having lower- and higher-pressure connections; means connecting said lower-pressure connection in gaseous pressure communication with the gas space above the liquid in said container; a measuring tube connecting the higher-pressure connection of said indicating means with a point in said container below the level of the liquid therein; a jacket tube about said measuring tube, said jacket tube covering at least the entire portion of said measuring tube extending within the liquid space of said container and extending at least to the end of said measuring tube; and means for passing gas of the same composition as said volatile liquid through said jacket tube into said container to maintain the end of said measuring tube free of liquid.

4. A liquid level indicating device for a container holding a volatile liquid having a normal boiling point below atmospheric temperatures comprising means for indicating a pressure difference, said indicating means having lower- and higher-pressure connections; means connecting said lower-pressure connection in gaseous pressure communication with the gas space above the liquid in said container; a measuring tube connecting the higher-pressure connection of said indicating means with a point in said container below the level of the liquid therein, at least the end portion of said measuring tube within said container being downwardly pitched toward said point in the container; a jacket tube about said measuring tube, said jacket tube covering at least the entire portion of said measuring tube extending within the liquid space of said container and extending slightly below the end of said measuring tube; and means for passing a gas of the same composition as said volatile liquid through said jacket tube into said container to maintain the end of said measuring tube free of liquid.

GEORGE H. ZENNER.